Patented July 3, 1945

2,379,555

UNITED STATES PATENT OFFICE 2,379,555

POLYGLYOXAL HYDRATE

Joseph Frederic Walker, Lewiston, N. Y., assignor to E. I. du Pont de Nemours & Company, Wilmington, Del., a corporation of Delaware No Drawing. Application January 19, 1942, Serial No. 427,352

2 Claims. (Cl. 260—340)

This invention relates to polyglyoxal hydrate and to a new and improved method by which it may be prepared from an aqueous solution of glyoxal. More particularly, it relates to certain new and highly water-soluble solid products constituting a mixture of polymerized glyoxal hydrates, and to a new and improved procedure by which this mixed polymeric product may be readily prepared from an aqueous solution of glyoxal.

Glyoxal, $C_2H_2O_2$, is stable in aqueous solution and is a convenient starting material for the preparation of my new polymerized glyoxal hydrate product. I have discovered that when an aqueous solution of glyoxal, preferably one substantially free from mineral acid and having a pH within the range 4 to 5, is subjected to distillation, there remains behind as still residue a polymeric glyoxal hydrate which contains a substantial quantity of combined water. When this material is dissolved in water it depolymerizes to yield glyoxal and is thus a convenient source of glyoxal.

My new product may be characterized as polyglyoxal hydrate, more particularly a mixture of polymeric, glyoxal hydrates possessing different degrees of polymerization and different amounts of combined water of hydration. It is completely stable as a solid product at ordinary temperatures, and at elevated temperatures up to 60° C. It possesses certain definite chemical and physical properties, and may be utilized for various purposes, as will be more fully set forth hereinafter.

Accordingly, it is an object of this invention to prepare polyglyoxal hydrate or, more particularly, a solid product comprising a mixture of the hydrates of polymerized glyoxal possessing different degrees of polymerization and different amounts of combined water. Another object of my invention is the preparation of this mixed polymeric product by distillation, preferably by distilling an aqueous solution of glyoxal at a pressure less than atmospheric. These and still further objects of my invention will be apparent from the ensuing disclosure of certain improved embodiments thereof.

When an aqueous solution of glyoxal is subjected to vacuum distillation at a temperature of approximately 60° C., there remains behind a solid still residue which is my novel product, polyglyoxal hydrate. It is not necessary to employ distillation at pressures less than atmospheric, provided the temperature is not allowed to exceed about 60° C. While vacuum distillation is the most satisfactory way of distilling at temperatures below 60° C., other procedures might be utilized, such as blowing air through the aqueous glyoxal solution at a temperature of below 60° C. Similarly, distillation at temperatures below 60° C. might be accomplished by introduction of agents which form azeotropic mixtures with water boiling below that temperature.

The aqueous solution of glyoxal distilled is preferably one which is substantially free from mineral acids, having a pH within the range 4.0 to 5.0. Neutral volatile impurities such as methanol or ethanol are removed in the distillation and do not interfere with the production of the polymeric hydrate. Non-volatile neutral solids, if present, remain behind as impurities in the product but do not exert any deleterious effect thereon.

If aqueous solutions of glyoxal which contain small amounts of mineral acids are subjected to distillation, the resulting solid product which remains behind as still residue is relatively slightly soluble in water. As I am primarily interested in preparing solid polyglyoxal hydrate products which are highly water-soluble, ordinarily it is advantageous to have the aqueous glyoxal solutions distilled substantially free from mineral acids. Solutions which contain only traces of mineral acids will generally yield products having a satisfactory degree of stability as first prepared, but these polyglyoxal products will generally become converted on storage to products of decreasing water-solubility.

If small amounts of alkali are present in the aqueous glyoxal solution, a reaction between the alkali and glyoxal will occur, resulting in the formation of salts of glycolic acid. However, relatively small amounts, for example traces, of alkali, do not seriously interfere with the formation of my desired product.

When an aqueous solution of glyoxal is distilled at atmospheric pressure, the temperature exceeding 60° C., the method and the resulting product are less satisfactory. While the conversion will take place when the solution is distilled at atmospheric pressure, little glyoxal being lost in the process, unfortunately the high temperatures necessary to complete the process impart undesirable characteristics to the product. These high temperatures result in some charring and the formation of a colored product. It has been observed that the rate of solution of this colored product in water is appreciably less than that of the substantially colorless material obtained by distilling at lower temperatures. As previously stated, I prefer to operate so that the temperature of distillation is less than about 60° C. and, when the distillation is carried out under reduced pressure, the pressure should therefore be less than that corresponding to about 150 millimeters of mercury.

The product is a mixture of simple hydrated glyoxal polymers having the typical formula $(C_2H_2O_2)_n.(H_2O)_m$. In this formula $n$ has an average value of from 3.0 to 4.0 and $m$ will vary from $n-1$ to $n+1$. The product will consist of a mixture of polymers ranging from the dimer, wherein $n$ is 2, to higher polymers, wherein $n$ is 5. The product may thus be represented as a mixture of hydrated polymeric products having the following formula:

$$(C_2H_2O_2)_n.(H_2O)_{(n-1) \text{ to } (n+1)}$$

As indicated, $n$ will vary from 2 to 5, the average value falling within the range 3.0 to 4.0. The product is a colorless, friable solid which has no perceptible odor, either in the solid state or in aqueous solution. When heated it is converted to monomeric glyoxal, the formaldehyde-like odor of the monomer becoming apparent.

My mixed polyglyoxal hydrate product is essentially a mixture of polymeric hydrates possessing different degrees of polymerization and different contents of combined water of hydration. Products containing from 70 to 80% of glyoxal, or even higher glyoxal contents, can be secured by my process. Thus, when the distillation is carried out under reduced pressure at approximately 60° C., there is obtained a product containing approximately 80% of glyoxal. When this product is subjected to vacuum dessication for approximately eighteen hours at a temperature of 100° C. over phosphorus pentoxide as the drying agent, there is obtained a product of approximately 85% glyoxal content. The rate of solution in water of this product is, however, less than that of the hydrated polymer of lower glyoxal content. In determining the glyoxal content of my product I have found that it is possible to utilize the standard alkaline peroxide procedure used for formaldehyde analysis, since glyoxal is also quantitatively oxidized to formic acid.

My mixed polymeric glyoxal hydrate product will have a melting or softening point dependent, to a large extent, on its glyoxal content. A material of approximately 73% glyoxal content will melt to a clear liquid at a temperature of 75 to 90° C. A product of 80% glyoxal content will soften appreciably at approximately 120° C. and, as the temperature is elevated, it will gradually char, rapid decomposition occurring at temperatures of 170 to 190° C.

The bulk density of the new product is approximately 0.48 gram per cubic centimeter. It is readily soluble in cold water, depolymerizing in solution to form the monomeric glyoxal hydrate. Its rate of solution varies slightly with glyoxal content. Thus, one gram of the product of 79% glyoxal content will dissolve in 5 cc. of water at room temperature in approximately five minutes. The material of 85% glyoxal content obtained, as described above, by vacuum dessication at 100° C., required twenty minutes for complete solution under similar test conditions. The product is soluble in alcohol but is insoluble in ether, hydrocarbons, and in the usual chlorinated hydrocarbon solvents.

At room temperature polyglyoxal hydrate is completely stable. Its stability is not adversely effected at temperatures up to at least 60° C. In aqueous solutions it does not behave as an active bactericide, and is to this extent contrasted with formaldehyde.

The structural chemical formula of polyglyoxal hydrate corresponding to the type formula $(C_2H_2O_2)_n.(H_2O)_{n+1}$ may be represented as follows:

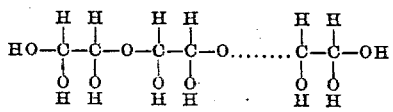

Regardless of the value of $n$ in the above formula, the maximum glyoxal content of the completely hydrated material would be 76.6%. Since products of higher glyoxal content have been obtained, it is evident that polyglyoxal hydrate includes partially dehydrated derivatives of the above polymer. The formation of rings by dehydration being probable, my mixed polymeric product will include materials which may be structurally represented as follows, this representative polymer being one containing 81.2% glyoxal.

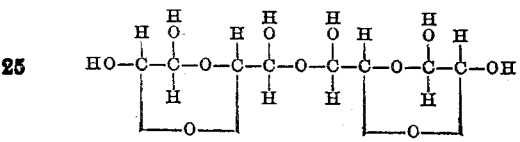

I have found that the molecular weight of a product containing 78.5% glyoxal is 264. A fully hydrated polyglyoxal material in which $n$ is 5, ($m$ being 6), will have a molecular weight of 398 and a glyoxal content of 72.8%. This is the product of highest molecular weight present in my polymeric mixture.

On heating, my novel product decomposes with slight charring to form the green vapor of monomeric glyoxal and water. A typical sample heated in a slow current of dry nitrogen for six and one-half hours at a temperature gradually increased from 130 to 168° C., yielded approximately 95% of glyoxal vapor, leaving behind a charred residue.

A dilute aqueous solution of polyglyoxal hydrate reduces ammoniacal silver nitrate solution immediately at room temperature, with a resulting silver mirror deposit. Fehling's solution is, however, not reduced in the cold by an aqueous solution of polyglyoxal hydrate. The solution merely becomes slightly cloudy and, on boiling, a small amount of reduction occurs. Similar conclusions as to the comparative reducing action of aqueous polyglyoxal hydrate solutions follow from treatment of Benedict's copper-citrate solution.

When caustic is added to an aqueous solution of polyglyoxal hydrate, an exothermic reaction occurs, the rapid consumption of the caustic being indicated by lowering in the pH value. The principal product of the reaction is a salt of glycolic acid, $CH_2OH.COONa$. The coloration of the solution is due to the formation of hydroxyquinones.

It should be understood that various changes and modifications may be made in my process as disclosed, without departing from the spirit of my invention. Accordingly, its scope is to be interpreted in accordance with the appended claims, and the prior art.

I claim:
1. The process of preparing a dry solid mixture of polymerized glyoxal hydrates which comprises distilling an aqueous solution of glyoxal which is substantially free from mineral acids and has a pH falling within the range 4.0 to 5.0, said distillation being carried out at a reduced pressure not exceeding that corresponding to 150 millimeters of mercury and at a temperature not in excess of 60° C.

2. A dry, substantially colorless solid mixture of products having empiric formulas as follows:

$$(C_2H_2O_2)_n \cdot (H_2O)_m$$

$n$ in the above formula ranging from 2 to 5 inclusive, and $m$ for any specific product ranging from $(n-1)$ to $(n+1)$ inclusive, said dry solid mixture having been prepared by distilling an aqueous solution of glyoxal which is substantially free from mineral acids and has a pH falling within the range 4.0 to 5.0, at a temperature not in excess of 60° C. and under a reduced pressure not exceeding that corresponding to 150 millimeters of mercury.

JOSEPH FREDERIC WALKER.